US012776584B2

(12) United States Patent
Okita et al.

(10) Patent No.: US 12,776,584 B2
(45) Date of Patent: Oct. 27, 2026

(54) REFLECTING DEVICE

(71) Applicant: Japan Display Inc., Tokyo (JP)

(72) Inventors: Mitsutaka Okita, Tokyo (JP); Shinichiro Oka, Tokyo (JP); Daiichi Suzuki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 19/078,438

(22) Filed: Mar. 13, 2025

(65) Prior Publication Data

US 2025/0210880 A1 Jun. 26, 2025

Related U.S. Application Data

(63) Continuation of application No. PCT/JP2023/027586, filed on Jul. 27, 2023.

(30) Foreign Application Priority Data

Sep. 15, 2022 (JP) ................................ 2022-147408

(51) Int. Cl.
*H01Q 15/14* (2006.01)

(52) U.S. Cl.
CPC ................................ *H01Q 15/148* (2013.01)

(58) Field of Classification Search
CPC ............................ H01Q 15/14; H01Q 15/148
See application file for complete search history.

(56) References Cited

U.S. PATENT DOCUMENTS

| | | | | |
|---|---|---|---|---|
| 6,369,870 | B1 * | 4/2002 | Koma | G02F 1/134309 349/181 |
| 2002/0021389 | A1 * | 2/2002 | Ha | G02F 1/13363 349/113 |
| 2010/0220036 | A1 | 9/2010 | Maruyama et al. | |
| 2022/0037785 | A1 * | 2/2022 | Okita | H01Q 21/0006 |

FOREIGN PATENT DOCUMENTS

| | | |
|---|---|---|
| JP | 2011-019021 A | 1/2011 |

OTHER PUBLICATIONS

International Search Report and Written Opinion mailed on Oct. 3, 2023, received for PCT Application No. PCT/JP2023/027586, filed on Jul. 27, 2023, 8 pages including English Translation.

* cited by examiner

*Primary Examiner* — Hoang V Nguyen
(74) *Attorney, Agent, or Firm* — XSENSUS LLP

(57) ABSTRACT

A reflecting device includes a first substrate, a second substrate facing the first substrate, a liquid crystal layer between the first substrate and the second substrate, a first reflective electrode arranged on the liquid crystal layer side of the first substrate, a ground electrode overlapping the first reflective electrode across the first substrate, and a liquid crystal control element including a first liquid crystal control electrode, and a common electrode opposed to the first liquid crystal control electrode across the liquid crystal layer, wherein the liquid crystal control element is arranged adjacent to the first reflective electrode.

11 Claims, 15 Drawing Sheets

REFLECTING DEVICE

CROSS-REFERENCE TO RELATED APPLICATIONS

This application is a Continuation of International Patent Application No. PCT/JP2023/027586, filed on Jul. 27, 2023, which claims the benefit of priority to Japanese Patent Application No. 2022-147408, filed on Sep. 15, 2022, the entire contents of each are incorporated herein by reference.

FIELD

An embodiment of the present invention relates to the structure of a reflecting device for radio waves using liquid crystal materials.

BACKGROUND

A reflecting device has the function of reflecting incoming radio waves in a desired direction. The reflecting device is used, for example, to reflect radio waves in areas where radio waves are difficult to reach (dead zones) such as between high-rise buildings. A reflecting device is disclosed in which a dielectric substrate is sandwiched between a main array element (dipole element) and a sub-array element (parasitic element) and a common electrode (ground electrode), and the sub-array element is arranged near the main array element (Japanese laid-open patent publication No. 2011-019021). A reflecting device is disclosed in which an array element and a common electrode (ground electrode) sandwich a dielectric substrate, and the common electrode has a periodic loop shape (Japanese laid-open patent publication No. 2010-226695).

The reflecting device has a dielectric substrate. When a part corresponding to this dielectric substrate is replaced with a liquid crystal layer, it is possible to use the dielectric anisotropy of the liquid crystal material and make the directionality of the reflected wave variable. Liquid crystal materials with dielectric anisotropy have a dielectric constant that changes depending on the orientation of the liquid crystal molecules.

SUMMARY

A reflecting device in an embodiment according to the present invention includes a first substrate, a second substrate facing the first substrate, a liquid crystal layer between the first substrate and the second substrate, a first reflective electrode arranged on the liquid crystal layer side of the first substrate, a ground electrode overlapping the first reflective electrode across the first substrate, a liquid crystal control element including a first liquid crystal control electrode, and a common electrode opposed to the first liquid crystal control electrode across the liquid crystal layer, wherein the liquid crystal control element is arranged adjacent to the first reflective electrode.

DESCRIPTION OF EMBODIMENTS

Hereinafter, embodiments of the present invention are described with reference to the drawings. However, the present invention can be implemented in many different aspects, and should not be construed as being limited to the description of the following embodiments. For the sake of clarifying the explanation, the drawings may be expressed schematically with respect to the width, thickness, shape, and the like of each part compared to the actual aspect, but the drawings are only an example and do not limit the interpretation of the present invention. For this specification and each drawing, elements similar to those described previously with respect to previous drawings may be given the same reference sign (or a number followed by A, B, etc.) and a detailed description may be omitted as appropriate. The terms “first” and “second” appended to each element are a convenience sign used to distinguish them and have no further meaning except as otherwise explained.

As used herein, where a member or region is “on” (or “below”) another member or region, this includes cases where it is not only directly on (or just under) the other member or region but also above (or below) the other member or region, unless otherwise specified. That is, it includes the case where another component is included in between above (or below) other members or regions.

First Embodiment

Figure 1:
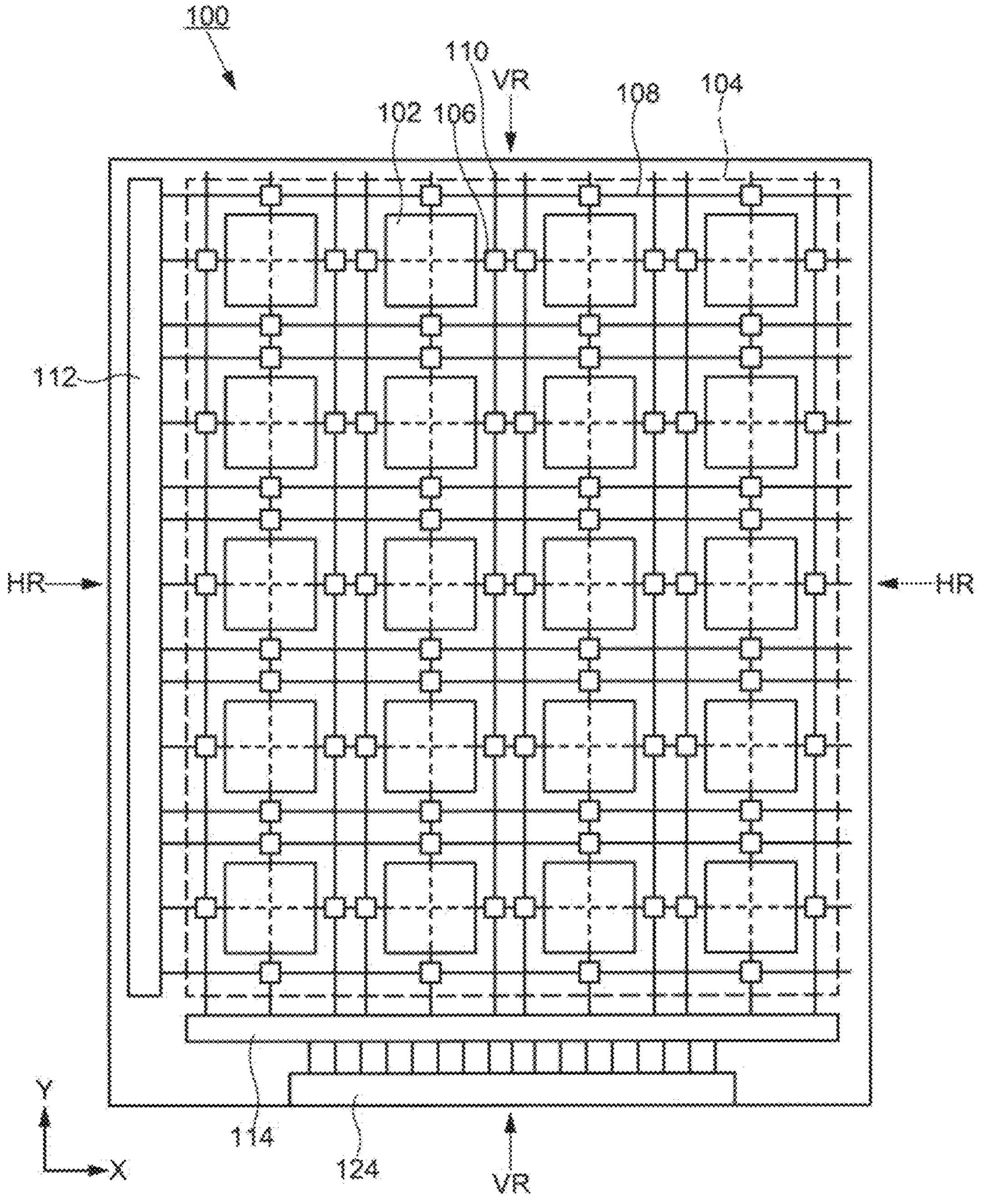
FIG. 1 is a configuration of a reflecting device according to an embodiment of the present invention.

FIG. 1 shows a configuration of a reflecting device 100 according to an embodiment of the present invention. The reflecting device 100 includes a reflective electrode 102, a ground electrode 104, and a liquid crystal control element 106. The reflective electrode 102 is arranged in a matrix pattern in the X-axis and Y-axis directions as shown in FIG. 1. The ground electrode 104 has a size that overlaps the entire region in which the reflective electrode 102 is arranged. The ground electrode 104 is arranged on the back side of the reflective electrode 102. The liquid crystal control element 106 is arranged adjacent to the reflective electrode 102. In other words, the liquid crystal control element 106 is arranged to be sandwiched between two adjacent reflective electrodes 102.

Note that the X-axis and Y-axis directions are used for explanation purposes and specifically refer to the directions displayed in FIG. 1. The X-axis and Y-axis directions can also be read as one direction and another direction that intersects the one direction, or as a first direction and a second direction that intersects the first direction. This notation is also used in other drawings and explanations based on them.

Although not shown in FIG. 1, the reflecting device 100 includes a liquid crystal layer. The liquid crystal layer is arranged to overlap a region where the reflective electrode 102 and the liquid crystal control element 106 are arranged. The liquid crystal control element 106 has a function of controlling the alignment state of the liquid crystal layer. Each of the liquid crystal control elements 106 arranged in the X-axis direction and the Y-axis direction has a function of controlling the alignment state of the liquid crystal layer.

The reflecting device 100 includes a selection signal line 108 extending in the X-axis direction and a control signal line 110 extending in the Y-axis direction. The selection signal line 108 and the control signal line 110 are arranged across an insulating layer (not shown). The reflecting device 100 may be arranged with a first driving circuit 112 and a second driving circuit 114. The first driving circuit 112 and the second driving circuit 114 are arranged in a region outside the region where the reflective electrodes 102 are arranged (hereinafter also referred to as "peripheral region"). The selection signal line 108 is connected to the first driving circuit 112, and the control signal line 110 is connected to the second driving circuit 114. The first driving circuit 112 outputs a selection signal to the selection signal line 108, and the second driving circuit 114 outputs a control signal to the control signal line 110.

The selection signal line 108 and the control signal line 110 are arranged corresponding to the arrangement of the liquid crystal control elements 106. When the X-axis direction is a row and the Y-axis direction is a column, the liquid crystal control elements 106 are selected for each row by the selection signal line 108, and a control signal is input from the control signal line 110 to each of the selected liquid crystal control elements 106. The first driving circuit 112 sequentially outputs selection signals to selection signal lines 108 arranged in the Y-axis direction. The second driving circuit 114 outputs control signals to the control signal lines 110 arranged in the X-axis direction in synchronization with the operation of the first driving circuit 112. The first driving circuit 112 and the second driving circuit 114 repeat such operations at a predetermined frequency (for example, 60 Hz), as in a liquid crystal display device, thereby inputting control signals to the liquid crystal control elements 106 arranged in the surface of the reflecting device 100.

A terminal part 124 is further arranged in the peripheral region of the reflecting device 100. The terminal part 124 is a region for forming a connection with an external circuit, and for example, a flexible printed circuit board (not shown) is connected. The flexible printed circuit board is used to connect the reflecting device 100 and a control circuit for driving the reflecting device 100. Signals for driving the first driving circuit 112 and the second driving circuit 114 from the control circuit are input to the terminal part 124.

The reflecting device 100 shown in FIG. 1 has a function of reflecting an incident radio wave by the reflective electrode 102. The reflecting device 100 can adjust the direction in which radio waves are reflected by individually controlling the liquid crystal control elements 106. For example, the reflecting device 100 can control the traveling direction of the reflected wave to any angle in the left-right direction when the drawing is viewed from the front with the reflection axis VR along the Y-axis direction as the center. The reflecting device 100 can control the traveling direction of the reflected wave to an arbitrary angle in the vertical direction when the drawing is viewed from the front with the reflection axis HR parallel to the X-axis direction as the center. Further, the reflecting device 100 can control the traveling direction of the reflected wave in the directions of diagonal upper right, diagonal lower right, diagonal upper left, and diagonal lower left when the drawing is viewed from the front.

Figure 2:
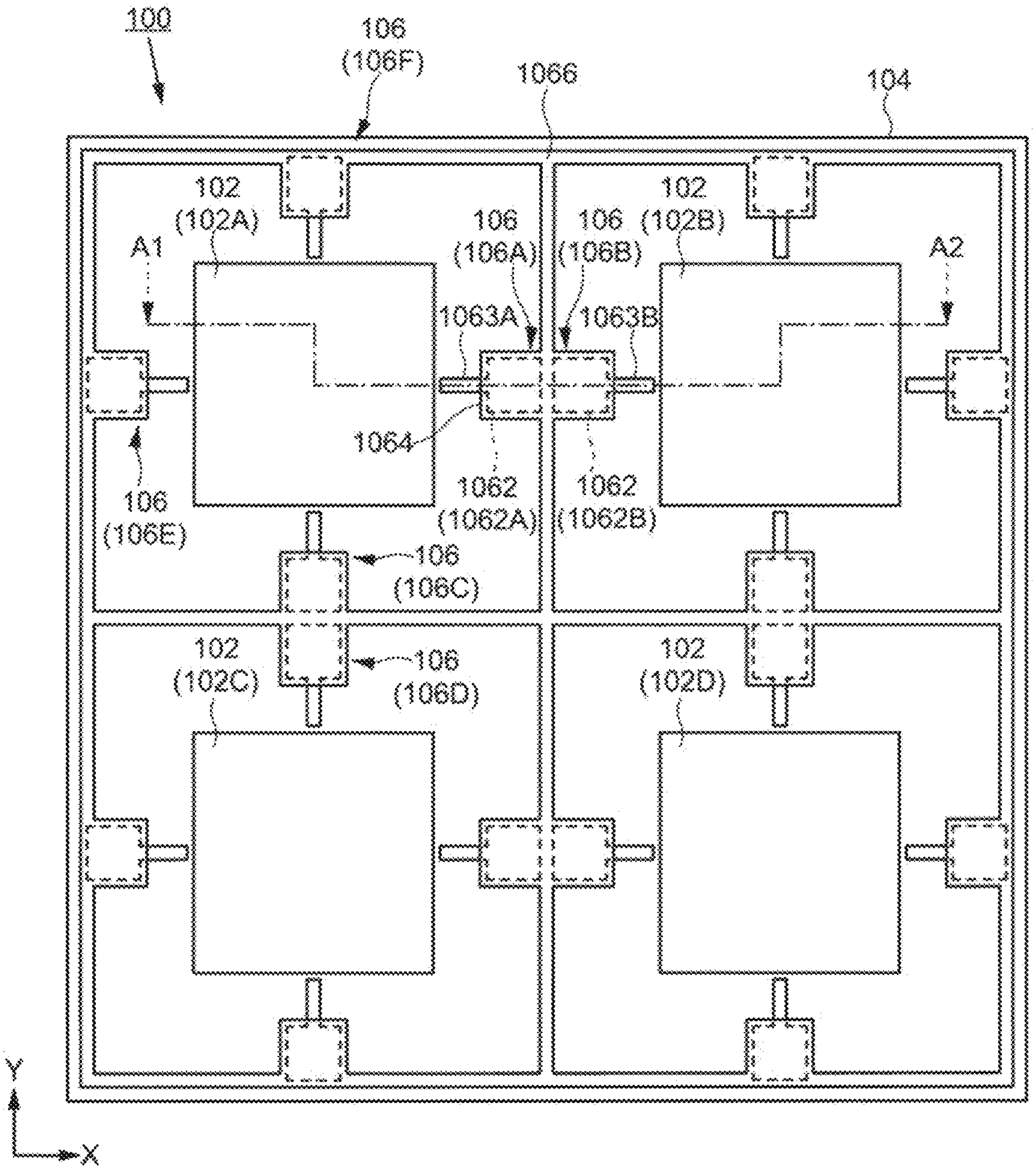
FIG. 2 is a planar layout of a reflecting device according to an embodiment of the present invention.

FIG. 2 shows a plan layout of the four reflective electrodes 102 (hereinafter, also referred to as the first reflective electrode 102A, the second reflective electrode 102B, the third reflective electrode 102C, and the fourth reflective electrode 102D), the liquid crystal control element 106 (hereinafter, some liquid crystal control elements will be referred to as a first liquid crystal control element 106A, a second liquid crystal control element 106B, a third liquid crystal control element 106C, and a fourth liquid crystal control element 106D.), and the ground electrode 104. The first reflective electrode 102A, the second reflective electrode 102B, the third reflective electrode 102C, and the fourth reflective electrode 102D are arranged at equal intervals. The second reflective electrode 102B is arranged apart from the first reflective electrode 102A in the X-axis direction, and the first liquid crystal control element 106A and the second liquid crystal control element 106B are arranged in the separated regions. The third reflective electrode 102C is arranged apart from the first reflective electrode 102A in the Y-axis direction, and the third liquid crystal control element 106C and the fourth liquid crystal control element 106D are arranged in the separated regions. The ground electrode 104 is arranged to overlap the first reflective electrode 102A, the second reflective electrode 102B, the third reflective electrode 102C, the fourth reflective electrode 102D, and the first liquid crystal control element 106A, the second liquid crystal control element 106B, the third liquid crystal control element 106C, and the fourth liquid crystal control element 106D in a plan view.

A size (length of one side in the X-axis direction and the Y-axis direction) of the first reflective electrode 102A, the second reflective electrode 102B, the third reflective electrode 102C, and the fourth reflective electrode 102D is suitably set in accordance with the frequency of the target radio wave. The shapes of the first reflective electrode 102A, the second reflective electrode 102B, the third reflective electrode 102C, and the fourth reflective electrode 102D are not limited to squares, and may be rectangles, polygons having more angles than rectangles, circles, and ellipses.

The reflecting device 100 targets a Very High Frequency (VHF) band, an Ultra-High Frequency (UHF) band, a Super High Frequency (SHF) band, Tremendously High Frequency (THF) band, an Extra-High Frequency (EHF) band, and a terahertz wave band. The liquid crystal molecules of the liquid crystal layer 116 change in orientation depending on the voltage of the control signal applied to the liquid crystal control electrode 1062 but hardly follow the frequency of the radio wave incident on the reflective electrode 102. Due to these characteristics of the liquid crystal molecules, while changing the dielectric constant of the liquid crystal layer 116 by the liquid crystal control electrode 1062, radio waves can be reflected by the reflective electrode 102, and the phases of the reflected waves can be made different in the plane of the reflecting device 100.

The first liquid crystal control element 106A and the second liquid crystal control element 106B are arranged between the first reflective electrode 102A and the second reflective electrode 102B. The first liquid crystal control element 106A includes a first liquid crystal control electrode 1062A and a common electrode 1064, and the second liquid crystal control element 106B includes a second liquid crystal control electrode 1062B and a common electrode 1064. The first liquid crystal control electrode 1062A is arranged on the side of the first reflective electrode 102A, and the second liquid crystal control electrode 1062B is arranged on the side of the second reflective electrode 102B. The first liquid crystal control electrode 1062A and the second liquid crystal control electrode 1062B are arranged so as to overlap the common electrode 1064 in a plan view. Although not shown in FIG. 2, a liquid crystal layer is arranged between the first liquid crystal control electrode 1062A and the second liquid crystal control electrode 1062B and the common electrode 1064.

The first liquid crystal control electrode 1062A is arranged apart from the first reflective electrode 102A and has a strip-shaped first conductive pattern 1063A extending toward the first reflective electrode 102A. A tip end of the first conductive pattern 1063A continuing from the first liquid crystal control electrode 1062A has a structure that does not contact the first reflective electrode 102A. A gap is formed between the first conductive pattern 1063A and the first reflective electrode 102A, and the gap does not connect the first conductive pattern 1063A DC-wise but capacitively couples the first reflective electrode 102A in a high frequency. The second liquid crystal control electrode 1062B and the second conductive pattern 1063B also have a similar structure in relation to the second reflective electrode 102B. The third liquid crystal control element 106C and the fourth liquid crystal control element 106D also have the same configuration as the first liquid crystal control element 106A.

The common electrode 1064 has a size overlapping both the first liquid crystal control electrode 1062A and the second liquid crystal control electrode 1062B. While the first liquid crystal control electrode 1062A and the second liquid crystal control electrode 1062B have two separate shapes, the common electrode 1064 has a continuous shape with respect to the two liquid crystal control electrodes. A voltage based on a control signal for controlling the alignment state of the liquid crystal layer is applied to the first liquid crystal control electrode 1062A and the second liquid crystal control electrode 1062B. The common electrode 1064 is controlled to have a constant potential.

The first liquid crystal control element 106A, the third liquid crystal control element 106C, the fifth liquid crystal control element 106E, and the sixth liquid crystal control element 106F are arranged around the first reflective electrode 102A. The respective common electrodes 1064 of the first liquid crystal control element 106A, the third liquid crystal control element 106C, the fifth liquid crystal control element 106E, and the sixth liquid crystal control element 106F are mutually connected by a common wiring 1066. As shown in FIG. 2, the common wiring 1066 is arranged to form a square surrounding the reflective electrode 102.

Figure 3:
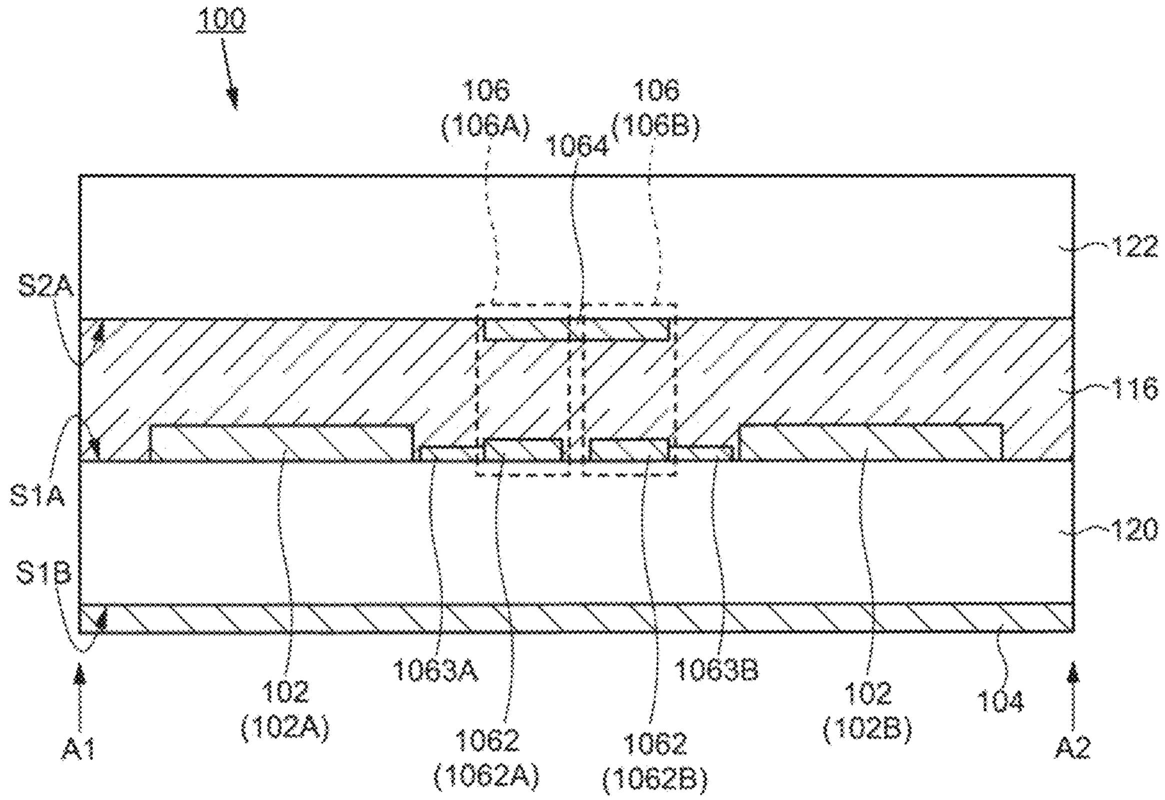
FIG. 3 is a cross-sectional view of a reflecting device according to an embodiment of the present invention.

FIG. 3 shows a cross-sectional structure of the region along a line A1-A2 shown in FIG. 2. As shown in FIG. 3, the reflecting device 100 includes a first substrate 120, a second substrate 122, and a liquid crystal layer 116. A first surface S1A of the first substrate 120 and a first surface S2A of the second substrate 122 are arranged to face each other, and a liquid crystal layer 116 is arranged therebetween. The first surface S1A of the first substrate 120 and the first surface S2A of the second substrate 122 may be a surface on the liquid crystal layer 116 side. Although not shown in FIG. 3, a spacer may be arranged between the first substrate 120 and the second substrate 122 to keep the substantial thickness of the liquid crystal layer 116 constant.

The first reflective electrode 102A and the second reflective electrode 102B are arranged on the first surface S1A of the first substrate 120. The ground electrode 104 is arranged on the second surface S1B (opposite to the first surface S1A) of the first substrate 120. As described above, the first reflective electrode 102A, the second reflective electrode 102B and the ground electrode 104 are arranged across the first substrate 120.

The first substrate 120 and the second substrate 122 are formed of a dielectric material. For example, a glass substrate is used for the first substrate 120 and the second substrate 122. The distance between the reflective electrode 102 and the ground electrode 104 can be adjusted by the thickness of the first substrate 120.

The first surface S1A of the first substrate 120 is arranged with the first liquid crystal control electrode 1062A and the second liquid crystal control electrode 1062B, and further arranged with the first conductive pattern 1063A and the second conductive pattern 1063B. The common electrode 1064 is arranged on the first surface S2A of the second substrate 122. The first liquid crystal control electrode 1062A and the second liquid crystal control electrode 1062B are arranged adjacent to each other, and the first conductive pattern 1063A and the second conductive pattern 1063B extend in different directions. In a cross-sectional view, the first liquid crystal control element 106A has a structure in which the first liquid crystal control electrode 1062A, the liquid crystal layer 116, and the common electrode 1064 overlap, and the second liquid crystal control element 106B has a structure in which the second liquid crystal control electrode 1062B, the liquid crystal layer 116, and the common electrode 1064 overlap.

The reflective electrode 102 and the liquid crystal control electrode 1062 may be formed of the same or different conductive layers. In other words, the reflective electrode 102 and the liquid crystal control electrode 1062 may have the same or different film thicknesses. The reflective electrode 102 preferably has a large film thickness in order to reflect radio waves, and the liquid crystal control electrode 1062 preferably has a small film thickness in order to thin the liquid crystal layer 116. For example, the reflective electrode 102 may have a film thickness of about 1 μm to 3 μm, and the liquid crystal control electrode 1062 may have a thickness of 0.1 to 0.5 μm. The conductive material for forming the reflective electrode 102 and the liquid crystal control electrode 1062 is not limited, and a metal material such as aluminum or a transparent conductive film material such as indium tin oxide (ITO) can be used.

The liquid crystal layer 116 is formed of a liquid crystal material having dielectric anisotropy. As the liquid crystal material, any material is sufficient as long as it exhibits liquid crystal properties and has anisotropy of dielectric constants, for example, nematic liquid crystal can be used. The dielectric anisotropy of the liquid crystal material may be positive or negative. Although not shown in FIG. 3, an alignment film for controlling the initial alignment state of the liquid crystal layer 116 may be arranged on the first substrate 120 and the second substrate 122.

As is clear from FIG. 2 and FIG. 3, the reflecting device 100 includes a structural portion formed by the reflective electrode 102 and the ground electrode 104 arranged across the first substrate 120, the liquid crystal layer 116 arranged on the upper surface of the reflective electrode 102 (the incident side of radio waves), and the liquid crystal control element 106 for controlling the alignment state of the liquid crystal layer 116.

Figure 4A:
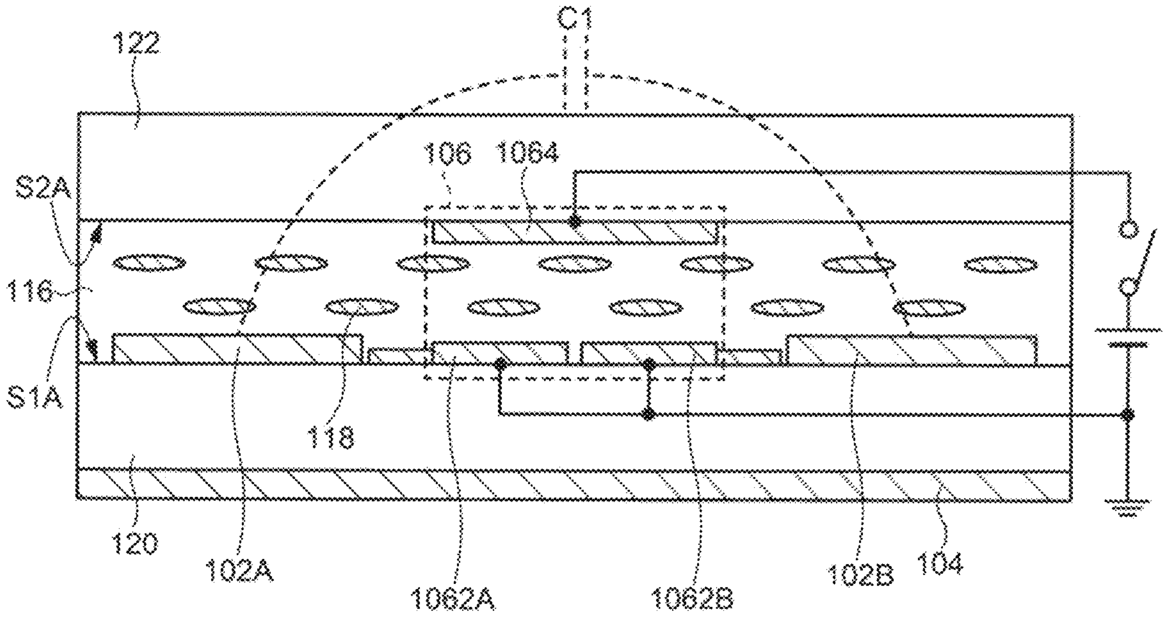
FIG. 4A is a diagram illustrating the operation of a reflecting device according to an embodiment of the present invention, and shows a voltage not being applied to a liquid crystal control electrode.
Figure 4B:
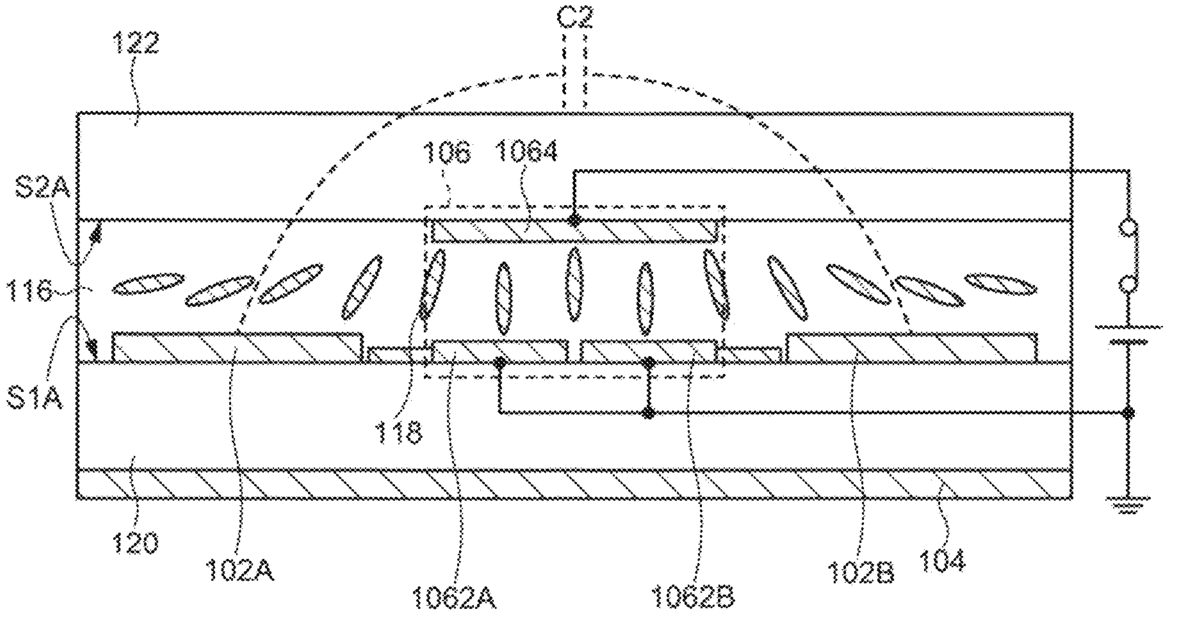
FIG. 4B is a diagram illustrating the operation of a reflecting device according to an embodiment of the present invention, and shows a voltage being applied to a liquid crystal control electrode.

FIG. 4A and FIG. 4B schematically show the operation of the liquid crystal control element 106. FIG. 4A shows a state in which a voltage is not applied between the first liquid crystal control electrode 1062A and the second liquid crystal control electrode 1062B and the common electrode 1064 (referred to as a "first state"). FIG. 4A shows a state in which the long axis direction of the liquid crystal molecules 118 is aligned in a direction parallel to the first surfaces S1A and S2A of the first substrate 120 and the second substrate 122 in the first state. FIG. 4B shows a state in which a control signal (DC voltage) is applied to the first liquid crystal control electrode 1062A, the second liquid crystal control electrode 1062B, and the common electrode 1064 (referred to as a "second state"). In the second state, the long axis of the liquid crystal molecules 118 is aligned perpendicular to the first surfaces S1A and S2A of the first substrate 120 and the second substrate 122 by the effect of an electric field generated between the first liquid crystal control electrode 1062A and the second liquid crystal control electrode 1062B and the common electrode 1064. The angle at which the long axis of the liquid crystal molecules 118 is aligned varies depending on the intensity of the generated electric field.

When the liquid crystal molecules 118 have positive dielectric anisotropy, the dielectric constant of the liquid crystal layer 116 is larger in the second state than in the first state. Therefore, the capacitance between the first reflective electrode 102A and the second reflective electrode 102B is larger in the capacitance C2 in the second state than in the capacitance C1 in the first state. When the liquid crystal molecules 118 have negative dielectric anisotropy, the apparent dielectric constant of the liquid crystal layer 116 is smaller in the second state than in the first state. Therefore, the capacitance between the first reflective electrode 102A and the second reflective electrode 102B is smaller in the capacitance C2 in the second state than in the capacitance C1 in the first state. The liquid crystal layer 116 can be regarded as a variable dielectric layer because the liquid crystal molecules 118 reversibly change their alignment state upon application of a voltage and the dielectric constant changes accordingly. FIG. 4B shows an example in which the same voltage is applied to the first liquid crystal control electrode 1062A and the second liquid crystal control electrode 1062B, but different voltages may be applied to the two liquid crystal control electrodes.

The reflecting device 100 according to the present embodiment is controlled so that the dielectric constant of the liquid crystal layer 116 is changed by the liquid crystal control element 106 arranged between the reflective electrodes 102, and the capacitance between the two adjacent reflective electrodes 102 is changed, thereby delaying (or not delaying) the phase of the reflected wave. That is, the reflecting device 100 according to the present embodiment is arranged between the first reflective electrode 102A and the second reflective electrode 102B, as shown in FIG. 3, with the first liquid crystal control element 106A and the second liquid crystal control element 106B for controlling the alignment state of the liquid crystal layer 116, and by changing the capacitance between the two reflective electrodes, the phase of the reflected wave is changed to control the traveling direction. When the same control signal is input to the first liquid crystal control element 106A and the second liquid crystal control element 106B, these two liquid crystal control elements can be regarded as one liquid crystal control element.

Figure 5:
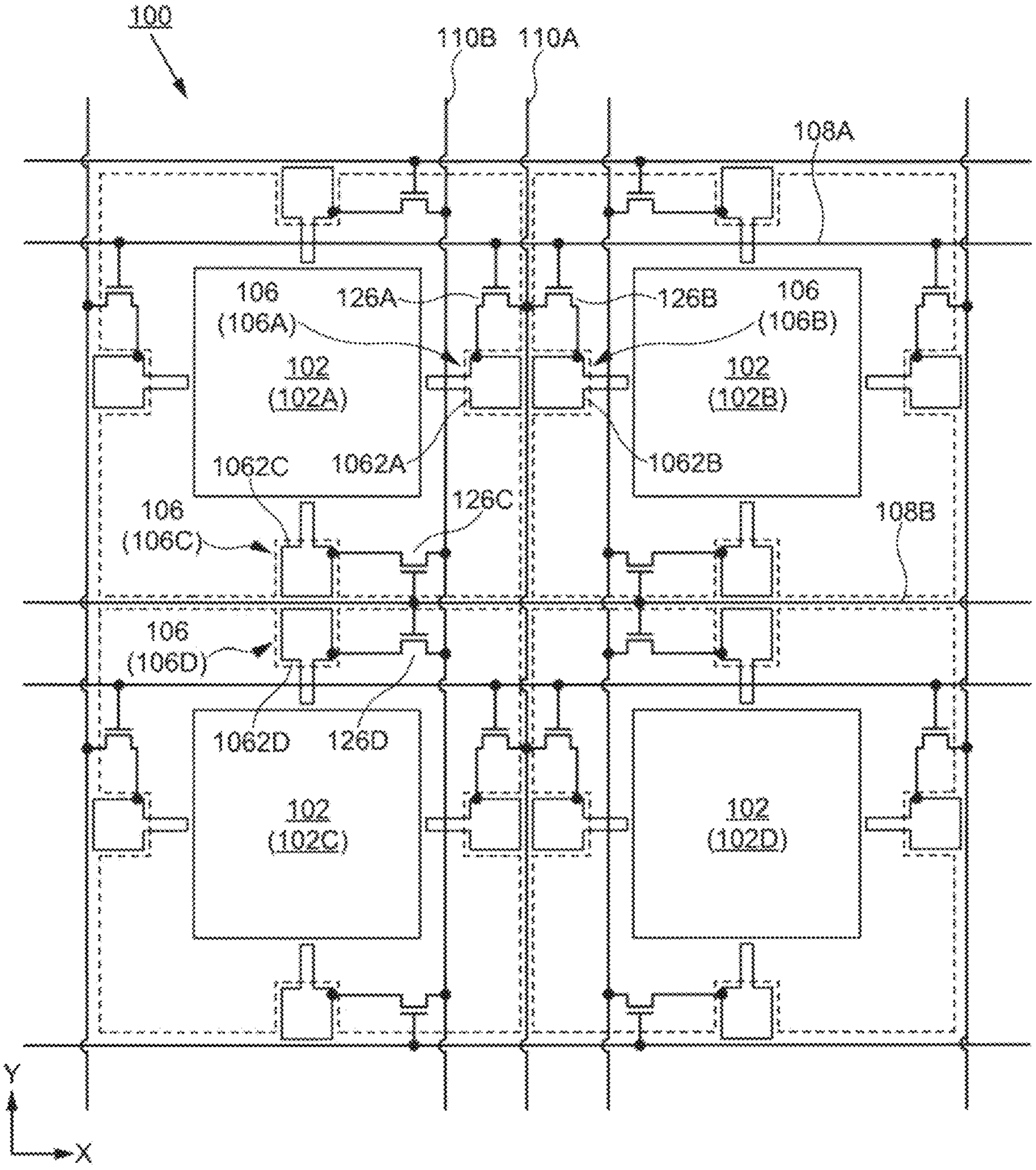
FIG. 5 is an example of a liquid crystal control circuit that applies a control signal to a liquid crystal control electrode of a liquid crystal control element of a reflecting device according to an embodiment of the present invention.

FIG. 5 shows an example of a liquid crystal control circuit for applying a control signal to the liquid crystal control electrode 1062 of the liquid crystal control element 106. The liquid crystal control circuit includes a first selection signal line 108A, a second selection signal line 108B, a first control signal line 110A, a second control signal line 110B, a first switching element 126A, and a second switching element 126B. The first liquid crystal control element 106A is controlled by the first switching element 126A. The first switching element 126A includes a control terminal for controlling the on-off state connected to the first selection signal line 108A, one of the input-output terminals connected to the first control signal line 110A, and the other of the input-output terminals connected to the first liquid crystal control electrode 1062A. The second liquid crystal control element 106B is controlled by a second switching element 126B. The second switching element 126B includes a control terminal for controlling the on-off state connected to the first selection signal line 108A, one of the input-output terminals connected to the second control signal line 110B, and the other of the input-output terminals connected to the second liquid crystal control electrode 1062B.

With such a circuit configuration, the first switching element 126A and the second switching element 126B are simultaneously controlled to the ON state, and a voltage based on a control signal is applied to the first liquid crystal control electrode 1062A and the second liquid crystal control electrode 1062B from the first control signal line 110A. Although the first liquid crystal control electrode 1062A and the second liquid crystal control electrode 1062B are separated into two electrodes, since the first switching element 126A and the second switching element 126B are turned on simultaneously and the same control signal is input, the first liquid crystal control element 106A and the second liquid crystal control element 106B can be regarded as one liquid crystal control element. The control signal is a DC voltage signal or a polarity reversal DC voltage signal in which a positive DC voltage and a negative DC voltage are alternately reversed.

In the third liquid crystal control element 106C and the fourth liquid crystal control element 106D shown in FIG. 5, the third liquid crystal control electrode 1062C is connected to the third switching element 126C, and the fourth liquid crystal control electrode 1062D is connected to the fourth switching element 126D. The control terminals of the third switching element 126C and the fourth switching element 126D are connected to the second selection signal line 108B, and one of the input-output terminals is connected to the second control signal line 110B. Such a connection is similar to that of the first liquid crystal control element 106A and the second liquid crystal control element 106B.

It is possible to change the capacitance between the first reflective electrode 102A and the second reflective electrode 102B and the capacitance between the first reflective electrode 102A and the third reflective electrode 102C by inputting control signals to the first liquid crystal control element 106A and the second liquid crystal control element 106B. Although the first liquid crystal control element 106A, the second liquid crystal control element 106B, the third liquid crystal control element 106C, and the fourth liquid crystal control element 106D will be described here, other liquid crystal control elements have the same configuration and perform the same operation.

It is possible to change the capacitance between the two reflective electrodes 102 by inputting a control signal to the liquid crystal control element 106 arranged between the two reflective electrodes 102. The reflecting device 100 according to the present embodiment can control the traveling direction of the reflected wave with respect to the incident radio wave by changing the capacitance between the two adjacent reflective electrodes 102 according to the change in the dielectric constant of the liquid crystal layer 116. The liquid crystal control element 106 can be individually controlled between the respective electrodes of the reflective electrodes 102, and the traveling direction of the reflected wave can be controlled in a wide range.

The first switching element 126A and the second switching element 126B are, for example, transistors, and preferably thin film transistors. When the first switching element 126A and the second switching element 126B are thin film transistors, the control terminal corresponds to a gate, and the input-output terminals correspond to a source and a drain. Although a specific structure is not shown in FIG. 3, the thin film transistor is formed on the first surface S1A of the first substrate 120. The thin film transistor is arranged on the lower layer side of the reflective electrode 102. The reflective electrode 102 and the liquid crystal control element 106 are preferably arranged on a planarization film in which thin film transistors are embedded.

The first substrate 120 and the second substrate 122 sandwich the liquid crystal layer 116 and are used to form a switching element and wiring. The first substrate 120 and the second substrate 122 are formed of an insulating material such as glass or resin and have flatness. The layers arranged on the first substrate 120 and the second substrate 122 are formed of the following materials. In the switching element 126, a silicon semiconductor such as amorphous silicon, polycrystalline silicon, or an oxide semiconductor material containing a metal oxide such as indium oxide, zinc oxide, gallium oxide is used as the semiconductor layer, an insulating material such as silicon oxide and silicon nitride is used as the gate insulating film, and a metal material such as aluminum, titanium and molybdenum is used as the wiring material. The selection signal line 108 and the control signal line 110 are formed of a metal material such as aluminum, molybdenum, titanium, or the like. The selection signal line 108 and the control signal line 110 may have a laminated structure of titanium/aluminum/titanium or a laminated structure of molybdenum/aluminum/molybdenum.

According to the present embodiment, the thickness of the liquid crystal layer 116 can be reduced by arranging the liquid crystal control element 106 for controlling the alignment state of the liquid crystal layer 116 between the two adjacent reflective electrodes 102. For example, the thickness of the liquid crystal layer 116 may be 30 μm or less, preferably about 5 μm. Since the liquid crystal layer 116 is thin at 30 μm or less than the case where the liquid crystal layer is thick at about 100 μm, the liquid crystal molecules 118 can be rapidly oriented. As a result, the response speed of the reflecting device 100 can be improved. It is possible to increase the capacitance between two adjacent reflective electrodes 102 by making the liquid crystal layer 116 thinner. Thereby, the reflecting device 100 can widen the adjustment range of the phase of the reflected wave. Furthermore, the liquid crystal control electrode 1062 can be miniaturized by thinning the liquid crystal layer 116. Thereby, the degree of freedom of layout design can be increased.

Second Embodiment

This embodiment shows a mode in which the structure of the liquid crystal control element is different from that of the first embodiment. In the following description, parts different from those of the first embodiment will be described, and common configurations will be omitted accordingly.

Figure 6:
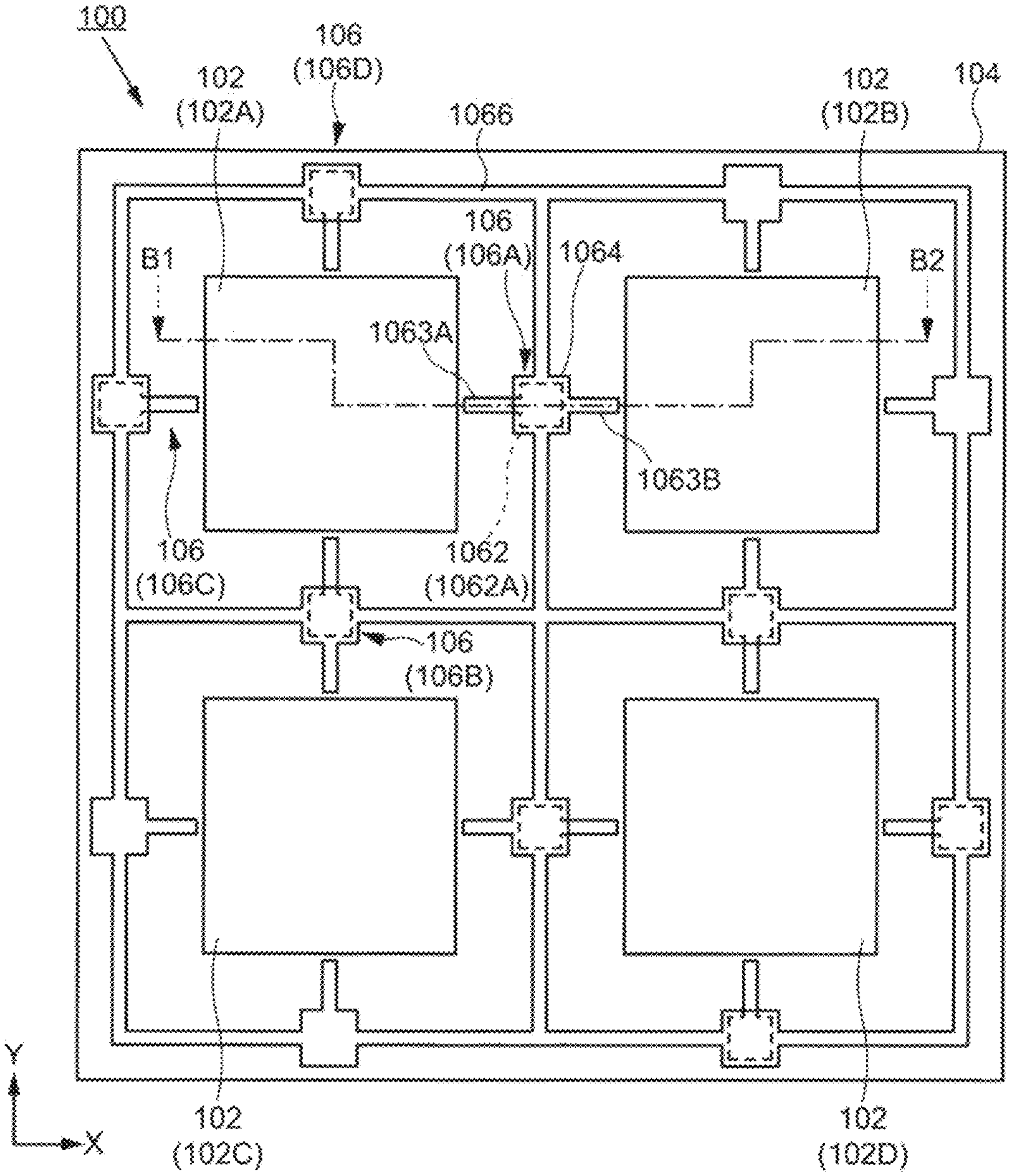
FIG. 6 is a plane layout of a reflecting device according to an embodiment of the present invention.

FIG. 6 shows a plan layout of four reflective electrodes 102 (first reflective electrode 102A, second reflective electrode 102B, third reflective electrode 102C, fourth reflective electrode 102D), the liquid crystal control element 106, and the ground electrode 104. As shown in FIG. 6, the first liquid crystal control element 106A is arranged between the first reflective electrode 102A and the second reflective electrode 102B. The first liquid crystal control element 106 has a structure in which the first liquid crystal control electrode 1062A, the liquid crystal layer (not shown), and the common electrode 1064 are laminated. In a plan view, the first liquid crystal control electrode 1062A and the common electrode 1064 are arranged to overlap each other. The first conductive pattern 1063A extends from the first liquid crystal control electrode 1062A toward the first reflective electrode 102A, and the second conductive pattern 1063B extends from the common electrode 1064 toward the second reflective electrode 102B.

The second liquid crystal control element 106B, the third liquid crystal control element 106C, and the fourth liquid crystal control element 106D are arranged around the first reflective electrode 102A in addition to the first liquid crystal control element 106A. In other words, the first liquid crystal control element 106 is arranged between the first reflective electrode 102A and the second reflective electrode 102B, and the second liquid crystal control element 106B is arranged between the first reflective electrode 102A and the third reflective electrode 102C. This arrangement is similar not only to the first reflective electrode 102A but also to the other reflective electrodes 102 and the liquid crystal control element 106.

Figure 7:
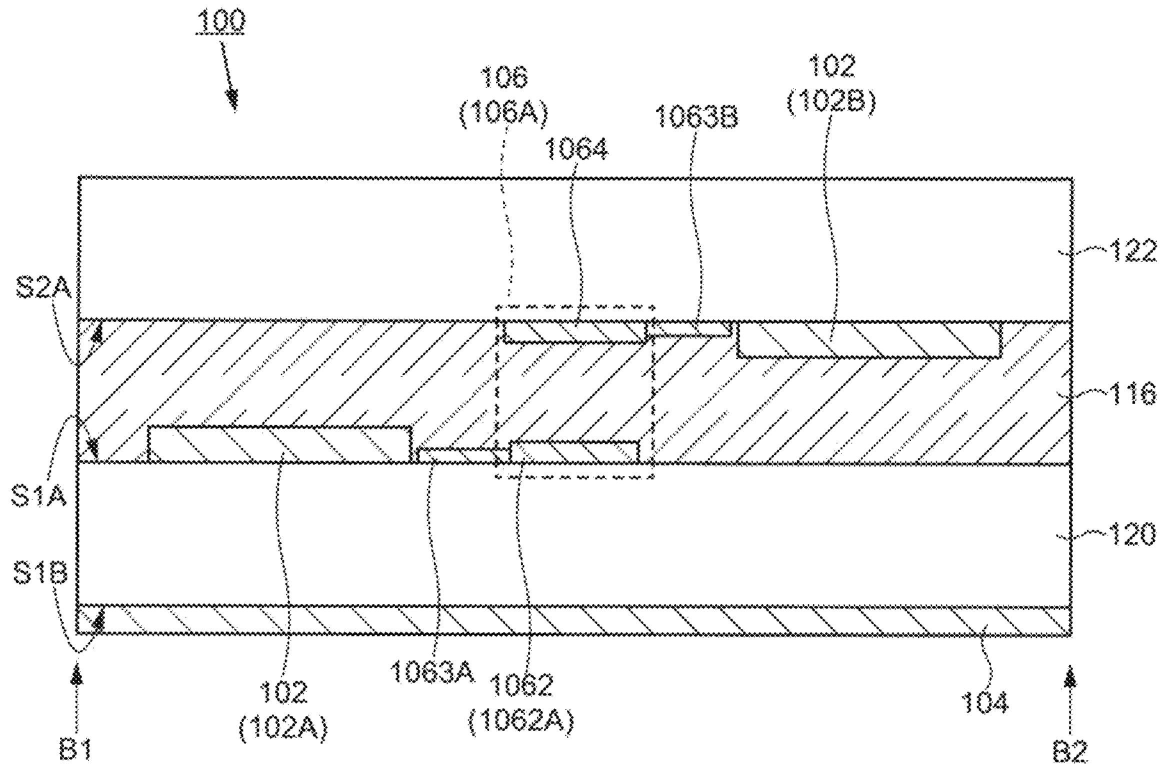
FIG. 7 is a cross-sectional view of a reflecting device according to an embodiment of the present invention.

FIG. 7 shows a cross-sectional structure of the region along a line B1-B2 shown in FIG. 6. As shown in FIG. 7, the first reflective electrode 102A is arranged on the first surface S1A of the first substrate 120, and the second reflective electrode 102B is arranged on the first surface S2A of the second substrate 122. The third reflective electrode 102C shown in FIG. 6 is arranged on the first surface S2A of the second substrate 122, and the fourth reflective electrode is arranged on the first surface S1A of the first substrate 120. The first liquid crystal control element 106A includes the first liquid crystal control electrode 1062A arranged on the first surface S1A of the first substrate 120, the liquid crystal layer 116, and the common electrode 1064 arranged on the first surface S2A of the second substrate 122. The first conductive pattern 1063A extending from the first liquid crystal control electrode 1062A is arranged on the first surface 121A of the first substrate 120, and the second conductive pattern 1063B extending from the common electrode 1064 is arranged on the first surface S2A of the second substrate 122. The first conductive pattern 1063A is arranged to be capacitively coupled to the first reflective electrode 102A, and the second conductive pattern 1063B is arranged to be capacitively coupled to the second reflective electrode 102B.

The alignment state of the liquid crystal layer 116 is controlled by the first liquid crystal control element 106A. Specifically, the alignment state of the liquid crystal layer 116 is controlled by applying a voltage between the first liquid crystal control electrode 1062A and the common electrode 1064. As a result, the capacitance between the first reflective electrode 102A and the second reflective electrode 102B changes as in the first embodiment.

According to the reflecting device 100 shown in FIG. 6, the second liquid crystal control element 106B, the third liquid crystal control element 106C, and the fourth liquid crystal control element 106D having the same structure as the first liquid crystal control element 106A are arranged around the first reflective electrode 102A. In other words, since the liquid crystal control element 106 is arranged between two adjacent reflective electrodes 102 in the reflecting device 100, the direction in which incident radio waves are reflected can be controlled as in the first embodiment.

Figure 8:
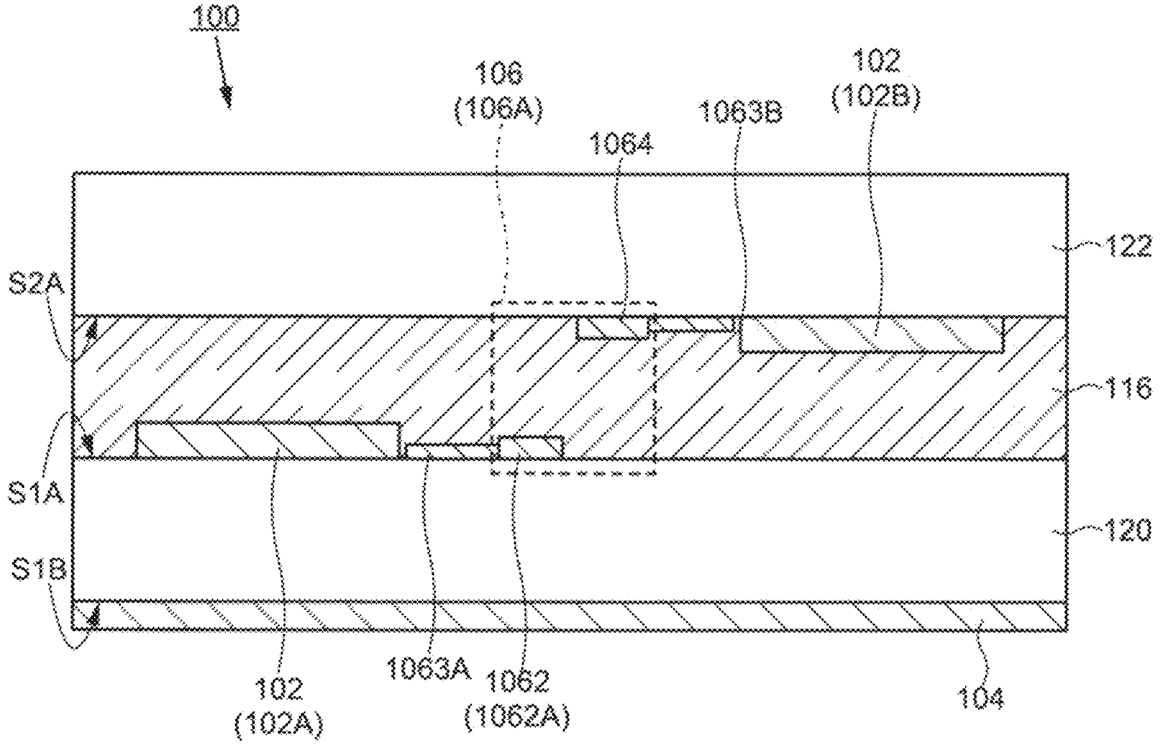
FIG. 8 is a cross-sectional view of a reflecting device according to an embodiment of the present invention.

As shown in FIG. 8, the liquid crystal control element 106 may be arranged so that the first liquid crystal control electrode 1062A and the common electrode 1064 do not overlap each other in a plan view and are diagonally displaced. Since an electric field (diagonal electric field) act between the first liquid crystal control electrode 1062A and the common electrode 1064 even with such an electrode arrangement, the capacitance between the first reflective electrode 102A and the second reflective electrode 102B can be controlled.

Figure 9:
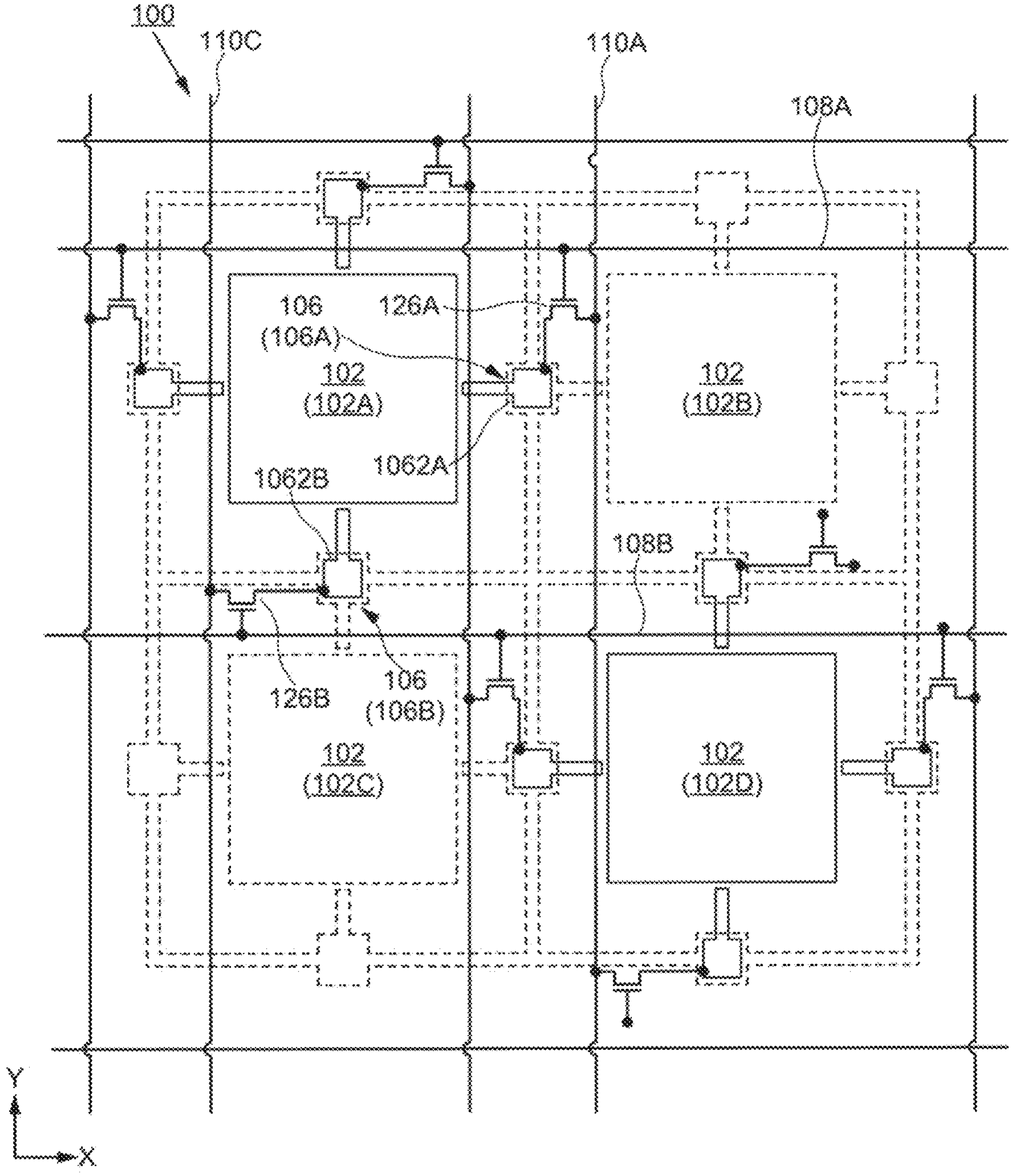
FIG. 9 is an example of a liquid crystal control circuit that applies a control signal to a liquid crystal control electrode of a liquid crystal control element of a reflecting device according to an embodiment of the present invention.

FIG. 9 shows an example of a liquid crystal control circuit for applying a control signal to the liquid crystal control electrode 1062 of the liquid crystal control element 106 in this embodiment. The liquid crystal control circuit includes a first selection signal line 108A, a second selection signal line 108B, a first control signal line 110A, a third control signal line 110C, a first switching element 126A, and a second switching element 126B. The first liquid crystal control element 106A is controlled by the first switching element 126A. The first switching element 126A includes a control terminal for controlling the on-off state connected to the first selection signal line 108A, one of the input-output terminals connected to the first control signal line 110A, and the other of the input-output terminals connected to the first liquid crystal control electrode 1062A. The second liquid crystal control element 106B is controlled by the second switching element 126B. The second switching element 126B includes a control terminal for controlling the on-off state connected to the second selection signal line 108B, one of the input-output terminals connected to the third control signal line 110C, and the other of the input-output terminals connected to the second liquid crystal control electrode 1062B.

The first switching element 126A and the second switching element 126B are controlled to be in the ON state at different timings by such a circuit configuration. A voltage based on a control signal is applied to the first liquid crystal control electrode 1062A from the first control signal line 110A, and a voltage based on a control signal is applied to the second liquid crystal control electrode 1062B from the third control signal line 110C. According to such a circuit configuration, a control signal different from that of the first liquid crystal control element 106A is capable of being input to the second liquid crystal control element 106B.

It is possible to change the capacitance between the two reflective electrodes 102 by inputting a control signal to the liquid crystal control element 106 arranged between the two reflective electrodes 102. The reflecting device 100 according to the present embodiment is capable of controlling the traveling direction of the reflected wave by a control signal input to the liquid crystal control element 106 as in the first embodiment. One liquid crystal control electrode 1062 is arranged in the liquid crystal control element 106, so that the number of switching elements may be reduced as compared with the first embodiment, and the circuit configuration can be simplified, in the reflecting device 100 of the present embodiment.

Third Embodiment

This embodiment shows a mode in which the structure of the liquid crystal control element is different from that of the second embodiment. Hereinafter, parts different from those of the second embodiment will be described, and common configurations will be omitted as appropriate.

Figure 10:
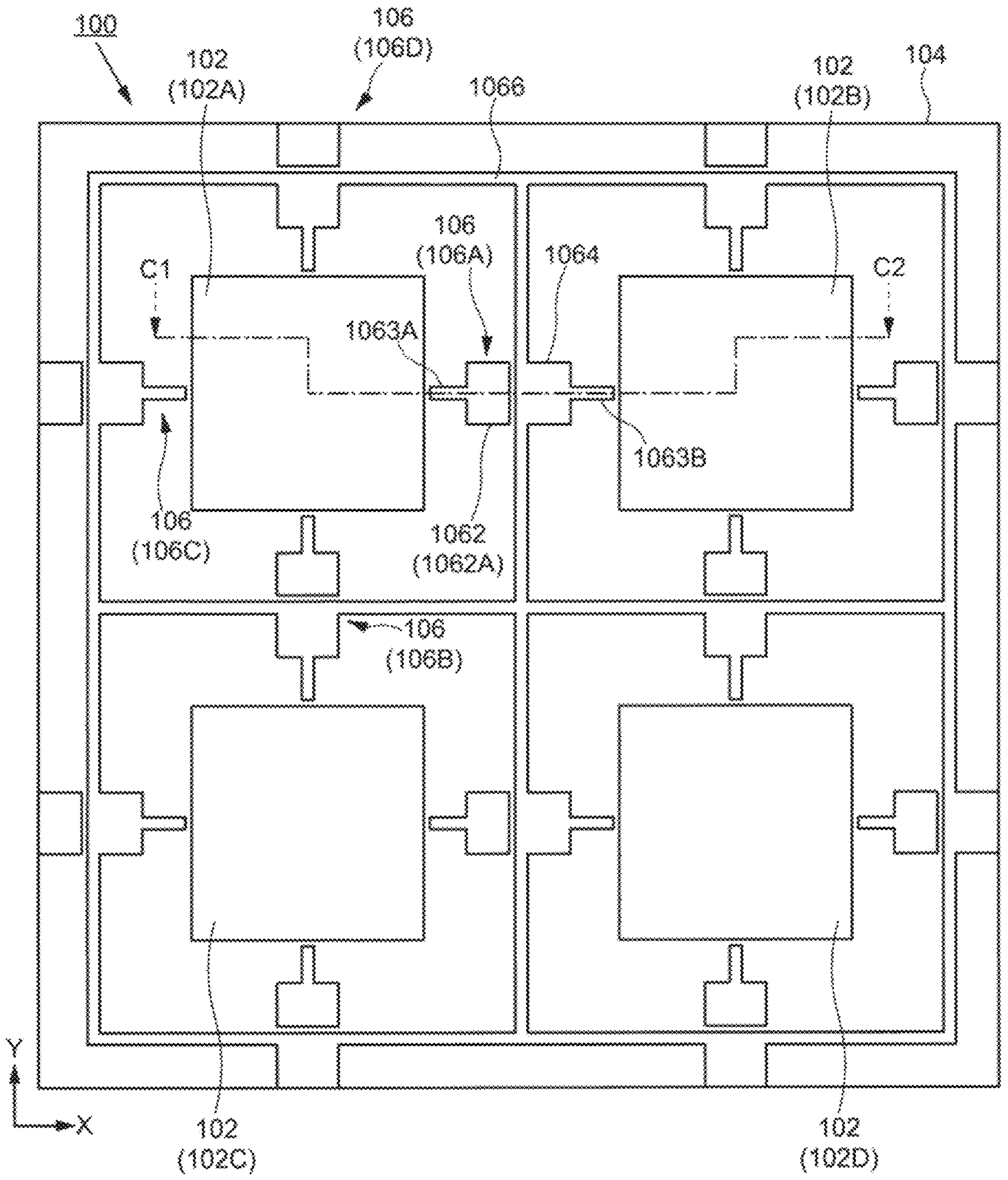
FIG. 10 is a plane layout of a reflecting device according to an embodiment of the present invention.

FIG. 10 shows a plan layout of the four reflective electrodes 102 (first reflective electrode 102A, second reflective electrode 102B, third reflective electrode 102C, fourth reflective electrode 102D), the liquid crystal control element 106, and the ground electrode 104. As shown in FIG. 10, the configuration in which the first liquid crystal control element 106A is arranged between the first reflective electrode 102A and the second reflective electrode 102B, and the second liquid crystal control element 106B, the third liquid crystal control element 106C, and the fourth liquid crystal control element 106D are arranged around the first reflective electrode 102A is the same as that in the second embodiment.

Figure 11:
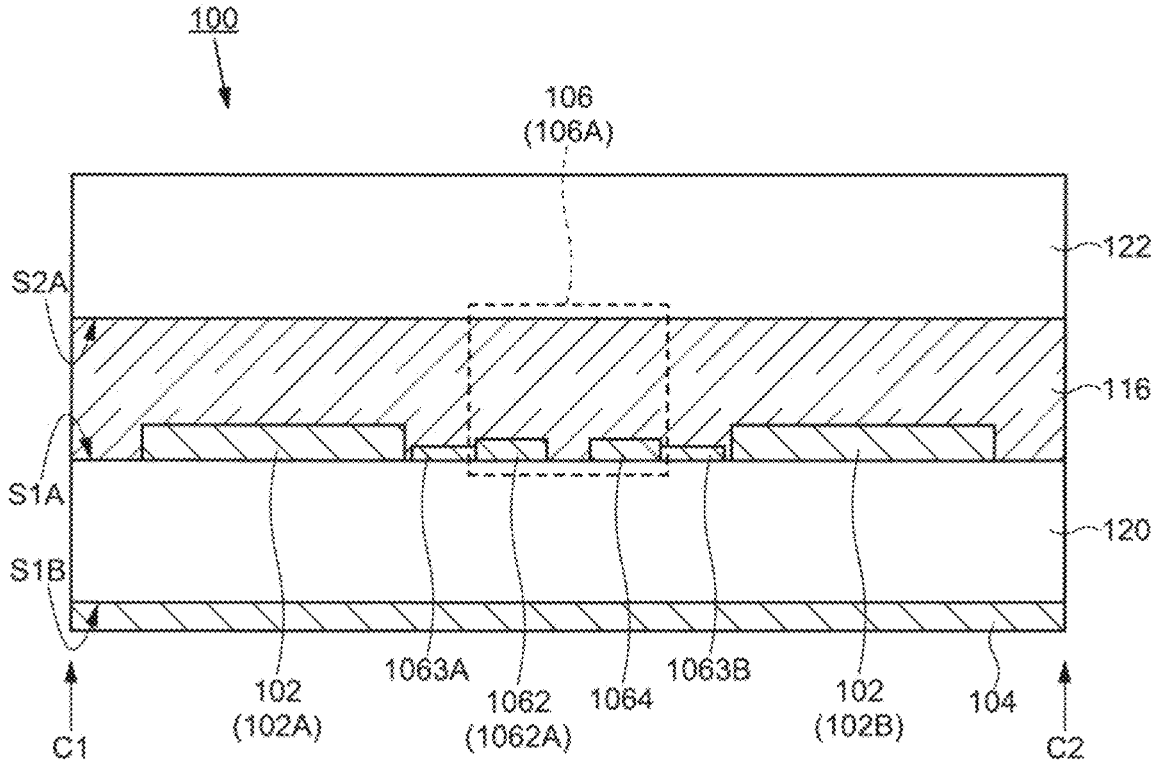
FIG. 11 is a cross-sectional view of a reflecting device according to an embodiment of the present invention.

FIG. 11 shows a cross-sectional structure of the region along a line C1-C2 shown in FIG. 7. As shown in FIG. 11, both the first reflective electrode 102A and the second reflective electrode 102B are arranged on the first surface S1A of the first substrate 120. The first liquid crystal control electrode 1062A and the common electrode 1064 of the first liquid crystal control element 106A are arranged on a first surface S1A of the first substrate 120. The first liquid crystal control electrode 1062A and the common electrode 1064 are arranged between the first reflective electrode 102A and the second reflective electrode 102B. The first liquid crystal control electrode 1062A and the common electrode 1064 are arranged to have a space, and the liquid crystal layer 116 is arranged so as to cover the upper surfaces of these electrodes. When different potentials are applied to the first liquid crystal control electrode 1062A and the common electrode 1064, a transverse electric field is generated, and the alignment state of the liquid crystal layer 116 can be controlled.

Although not shown in FIG. 11, the liquid crystal molecules of the liquid crystal layer 116 align their long axes parallel to the first surface S1A of the first substrate 120 in a state where an electric field does not act. The liquid crystal molecules are controlled to rotate while maintaining a parallel state by a transverse electric field generated between the first liquid crystal control electrode 1062A and the common electrode 1064. Such a liquid crystal is also called an IPS liquid crystal or an IPS drive system in the field of liquid crystal display devices. It is possible to change the capacitance between the first reflective electrode 102A and the second reflective electrode 102B by using the liquid crystal layer 116 having such an alignment state, thereby controlling the direction of travel of the reflected radio waves in the reflecting device 100.

Figure 12:
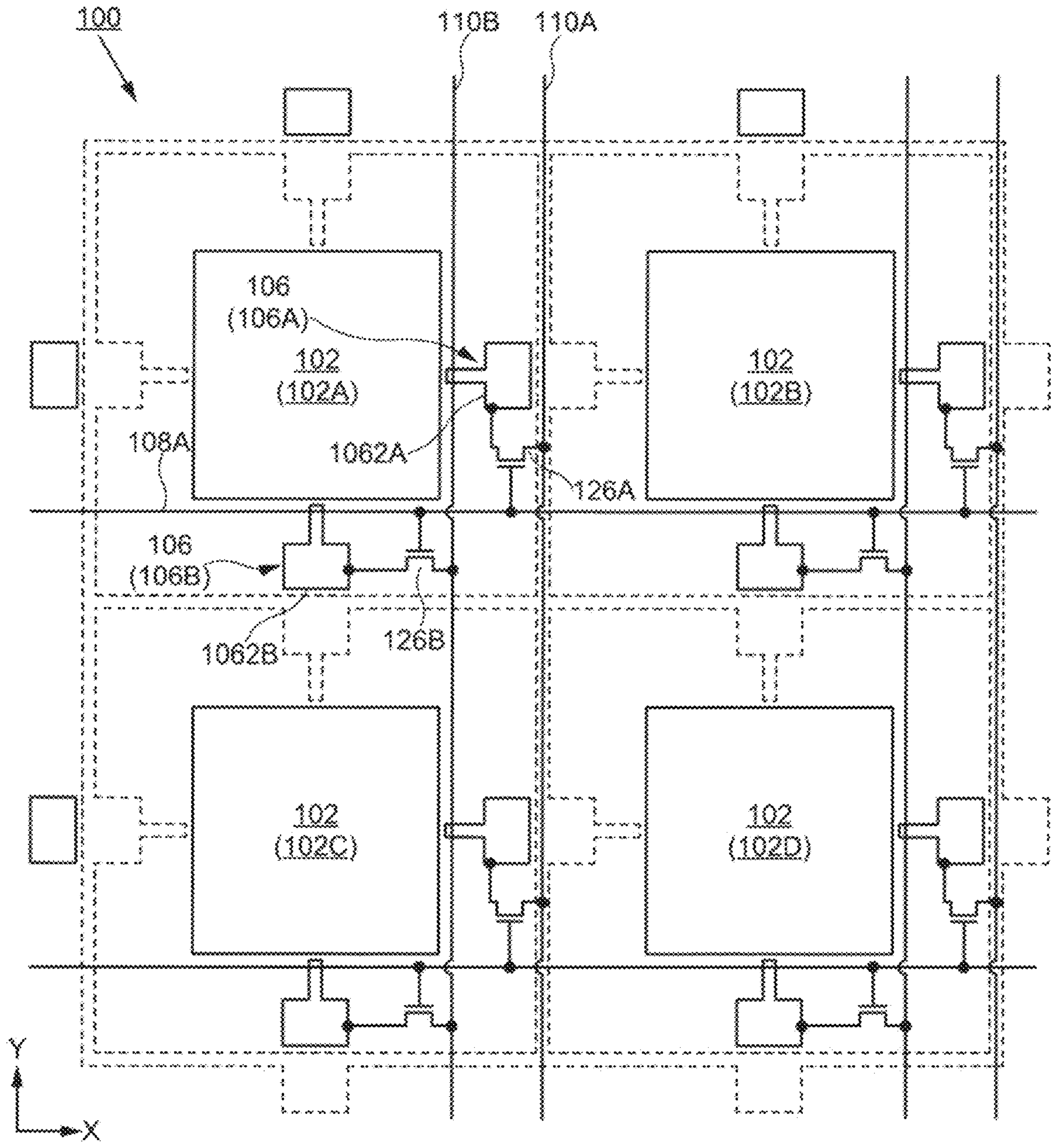
FIG. 12 is an example of a liquid crystal control circuit that applies a control signal to a liquid crystal control electrode of a liquid crystal control element of a reflecting device according to an embodiment of the present invention.

FIG. 12 shows an example of a liquid crystal control circuit for applying a control signal to the liquid crystal control electrode 1062 corresponding to the configuration of the liquid crystal control element 106 according to the present embodiment. The liquid crystal control circuit includes a selection signal line, a control signal line, and a switching element. The first switching element 126A for controlling the first liquid crystal control element 106A has a control terminal for controlling the on-off state connected to the first selection signal line 108A, one of the input-output terminals connected to the first control signal line 110A, and the other of the input-output terminals connected to the first liquid crystal control electrode 1062A. The second switching element 126B for controlling the second liquid crystal control element 106B has a control terminal for controlling the on-off state connected to the first selection signal line 108A, one of the input-output terminals connected to the second control signal line 110B, and the other of the input-output terminals connected to the second liquid crystal control electrode 1062B.

With such a circuit configuration, it is possible to simultaneously control the first switching element 126A and the second switching element 126B to the ON state, apply a voltage based on a control signal from the first control signal line 110A to the first liquid crystal control electrode 1062A, and apply a voltage based on a control signal from the second control signal line 110B to the second liquid crystal control electrode 1062B.

It is possible to change the capacitance between the first reflective electrode 102A and the second reflective electrode 102B and the capacitance between the first reflective electrode 102A and the third reflective electrode 102C by inputting control signals into the first liquid crystal control element 106A and the second liquid crystal control element 106B. Although the first liquid crystal control element 106A and the second liquid crystal control element 106B will be described here, other liquid crystal control elements have the same configuration and perform the same operation.

The circuit configuration of the reflecting device 100 according to the present embodiment can be simplified because one liquid crystal control electrode 1062 is arranged in the liquid crystal control element 106, thereby reducing the number of switching elements and the number of signal lines as compared with the first embodiment. The reflecting device 100 according to the present embodiment is the same as that of the first embodiment except that the configuration of the liquid crystal control circuit is different, and the same advantageous effect can be achieved.

Fourth Embodiment

Figure 13:
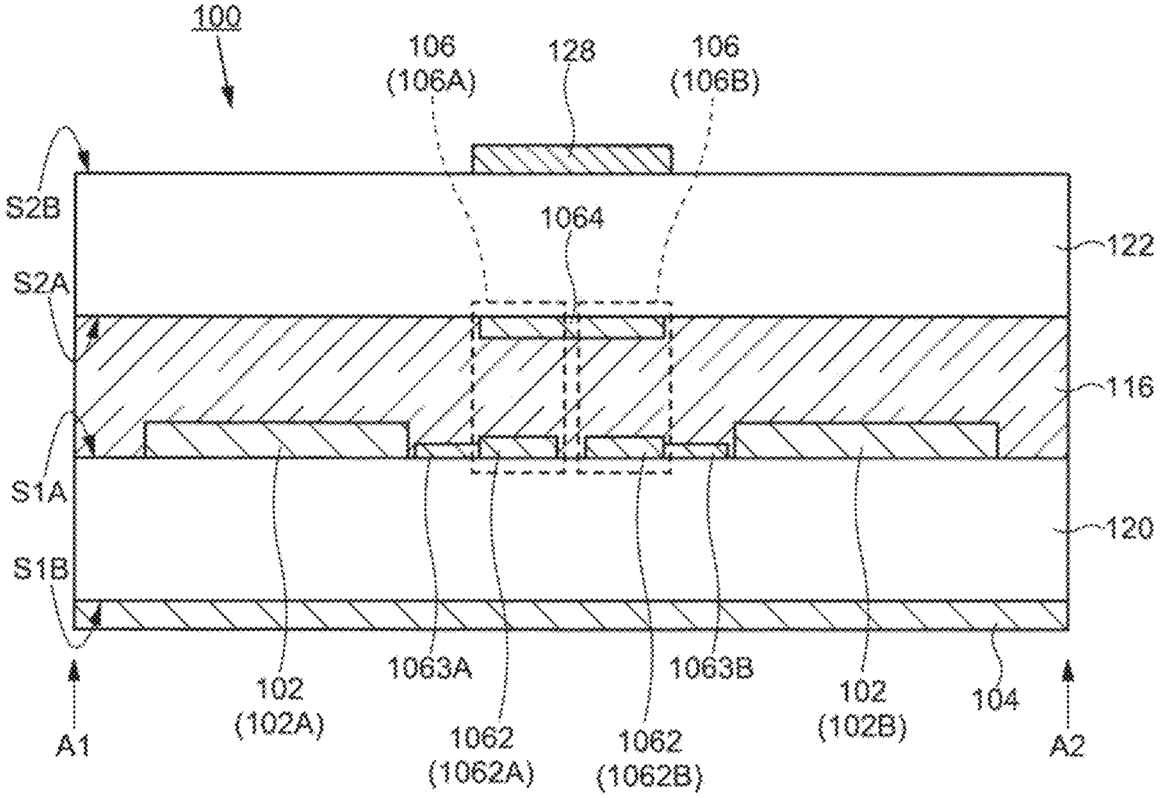
FIG. 13 is a cross-sectional view of a reflecting device according to an embodiment of the present invention.

As shown in FIG. 13, a radio wave absorbent 128 may be arranged so as to overlap the liquid crystal control element 106 in a plan view. The radio wave absorbent 128 is preferably arranged on the second surface S2B of the second substrate 122. It is possible to reduce unnecessary reflection by arranging the radio wave absorbent 128 to overlap the liquid crystal control element 106.

The configuration of this embodiment can be appropriately combined with the reflecting device 100 shown in the first to third embodiments.

Fifth Embodiment

Figure 14:
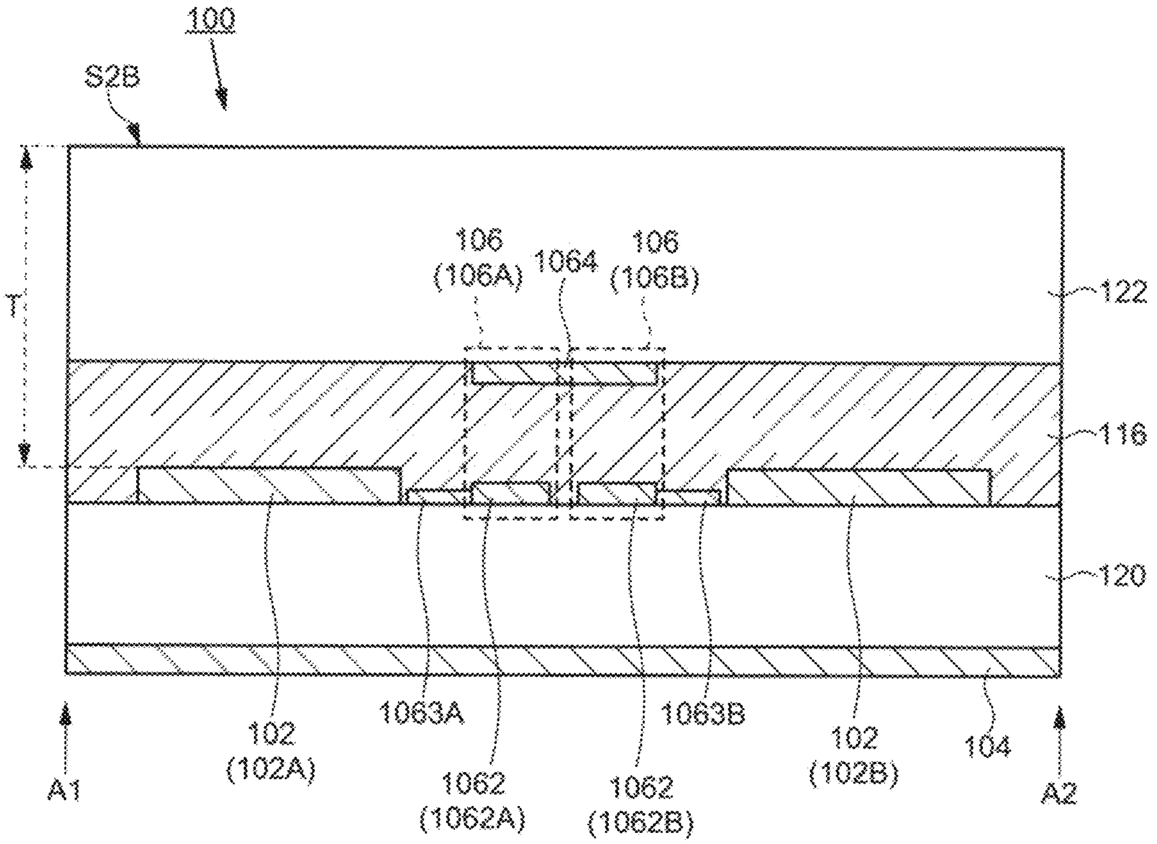
FIG. 14 is a cross-sectional view of a reflecting device according to an embodiment of the present invention.

FIG. 14 shows a reflecting device 100 having a cross-sectional structure along the line A1-A2 shown in FIG. 2 and a structure different from that of the first embodiment. The reflecting device 100 according to the present embodiment has a thick structure of the second substrate 122 arranged on the reflective electrode 102. Specifically, as shown in FIG. 14, the length T from the upper surface of the reflective electrode 102 to the second surface S2B of the second substrate 122, including the thickness of the liquid crystal layer 166, has a length corresponding to ¼ of the wavelength λ of the reflected radio wave. In this case, the liquid crystal layer 166 and the second substrate 122 can be regarded as dielectric layers. Since the length T has such a length, the amplitude of the reflected wave can be increased. The second substrate 122 is not limited to a single substrate but may have a structure in which a plurality of substrates or a plurality of dielectric layers overlap.

The configuration of this embodiment can be appropriately combined with the reflecting device 100 shown in the first to fourth embodiments.

As described above, various configurations of the reflecting device illustrated as an embodiment of the present invention can be suitably combined as long as they do not contradict each other. Based on the reflecting device disclosed in the present specification and the drawings, appropriate additions, deletions or design changes of components, or additions, omissions or conditions changes of steps made by a person skilled in the art are also included in the scope of the present invention as long as they have the gist of the present invention.

It is understood that other advantageous effects which are different from those brought about by the embodiments disclosed herein, but which are apparent from the description herein or can be easily predicted by those skilled in the art, are naturally brought about by the invention.

What is claimed is:

1. A reflecting device comprising:

a first substrate;

a second substrate facing the first substrate;

a liquid crystal layer between the first substrate and the second substrate;

a first reflective electrode arranged on the liquid crystal layer side of the first substrate;

a ground electrode overlapping the first reflective electrode across the first substrate; and a liquid crystal control element including a first liquid crystal control electrode, and a common electrode opposed to the first liquid crystal control electrode across the liquid crystal layer, wherein the liquid crystal control element is arranged adjacent to the first reflective electrode.

2. The reflecting device according to claim 1, further comprising a second reflective electrode adjacent to the first reflective electrode, wherein the liquid crystal control element is arranged between the first reflective electrode and the second reflective electrode.

3. The reflecting device according to claim 2, wherein the first liquid crystal control electrode is arranged on the liquid crystal layer side of the first substrate, and the common electrode is arranged on the liquid crystal layer side of the second substrate.

4. The reflecting device according to claim 3, wherein the first liquid crystal control electrode and the common electrode overlap in a plan view.

5. The reflecting device according to claim 3, wherein the first liquid crystal control electrode and the common electrode are diagonally crossed in a cross-sectional view.

6. The reflecting device according to claim 3, further comprising a second liquid crystal control electrode overlapping the common electrode in a plan view, wherein the second liquid crystal control electrode is adjacent to the first liquid crystal control electrode.

7. The reflecting device according to claim 6, wherein the first liquid crystal control electrode is configured to be capacitively coupled to the first reflective electrode and the second liquid crystal control electrode is configured to be capacitively coupled to the second reflective electrode.

8. The reflecting device according to claim 6, further comprising a radio wave absorbent, wherein the radio wave absorbent overlaps the common electrode in a plan view, and the second substrate is interposed between the radio wave absorbent and the common electrode.

9. The reflecting device according to claim 2, wherein the first liquid crystal control electrode and the common electrode are arranged on the side of the first substrate facing the liquid crystal layer, and the first liquid crystal control electrode and the common electrode are arranged adjacent to each other.

10. The reflecting device according to claim 1, wherein a thickness of the liquid crystal layer and the second substrate on the reflective electrode is equivalent to $\lambda/4$ of the incident wavelength $\lambda$.

11. The reflecting device according to claim 1, wherein a thickness of the liquid crystal layer is less than 30 μm.

* * * * *